Oct. 16, 1945.  W. W. LONEY  2,387,160
ARTICLE HANDLING APPARATUS
Filed May 12, 1942    6 Sheets-Sheet 3
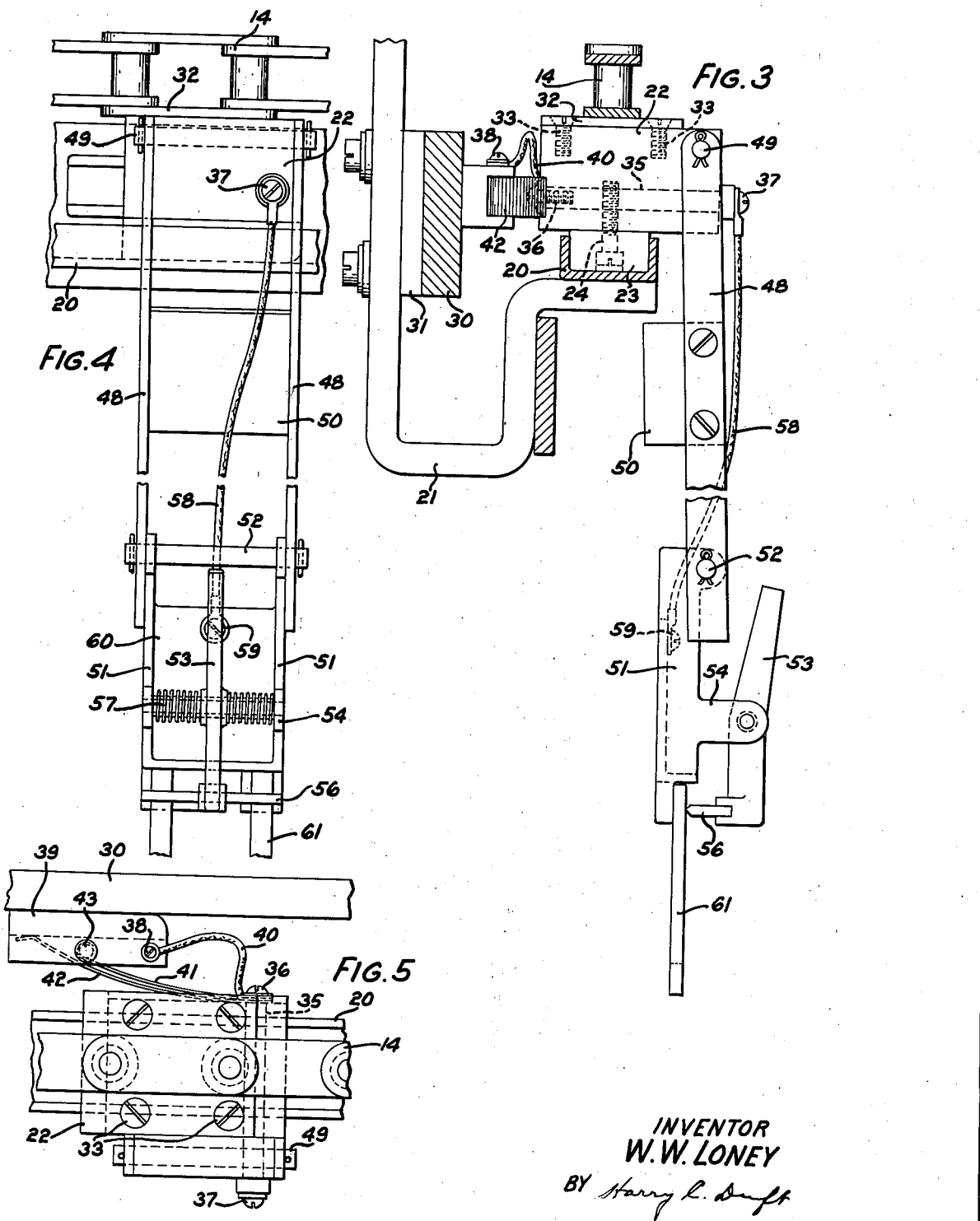
INVENTOR
W. W. LONEY
BY Harry R. Duft
ATTORNEY

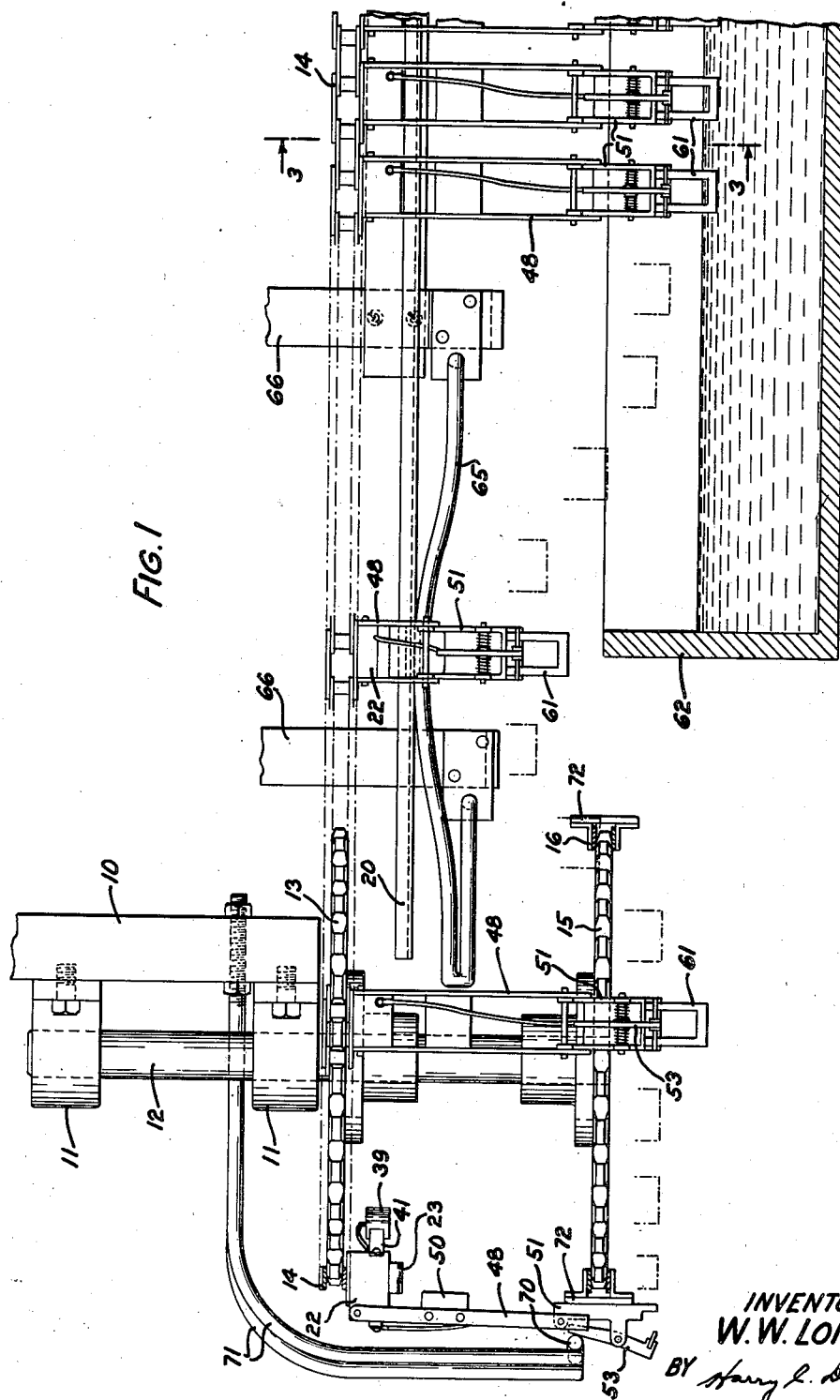

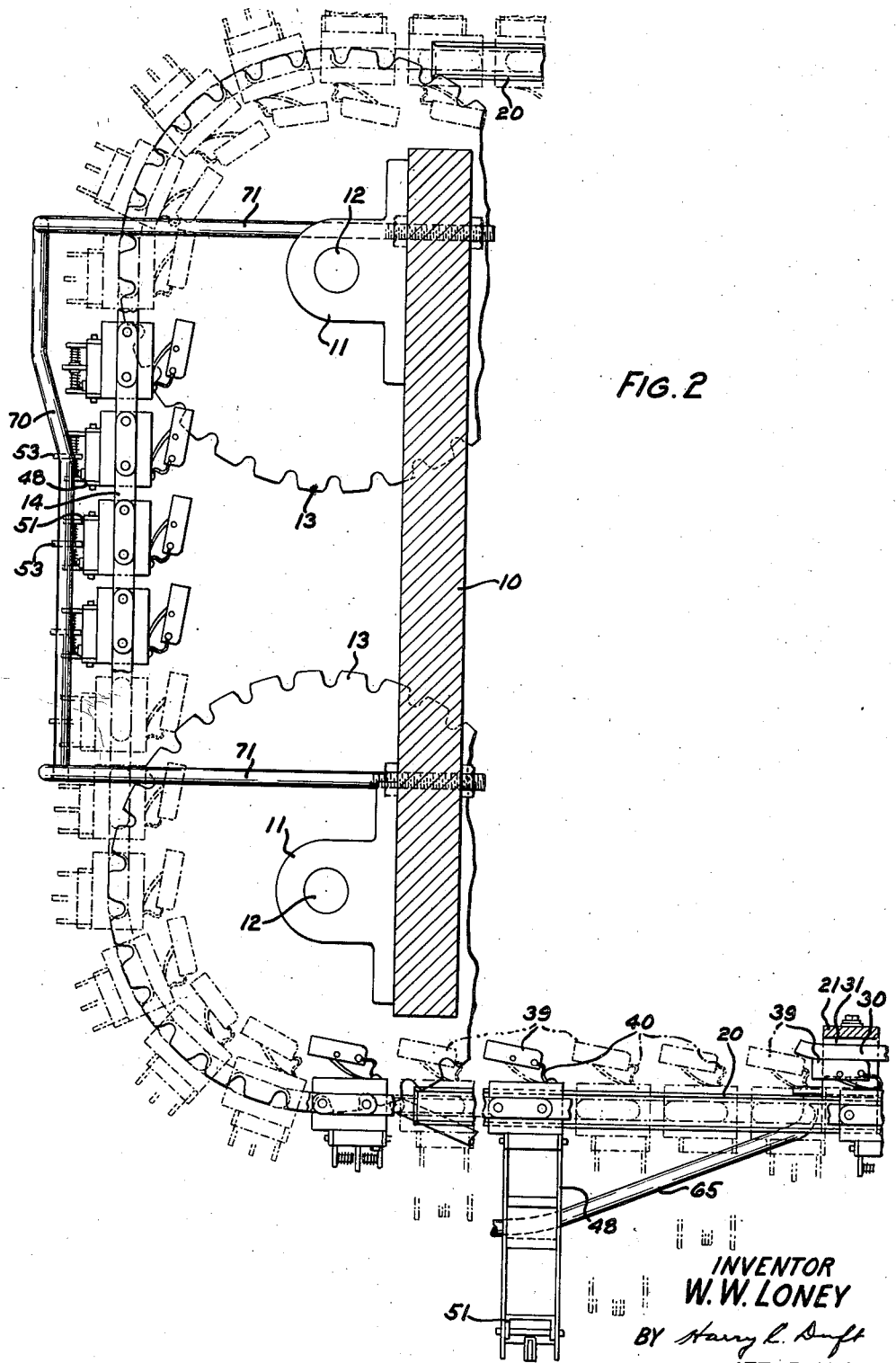

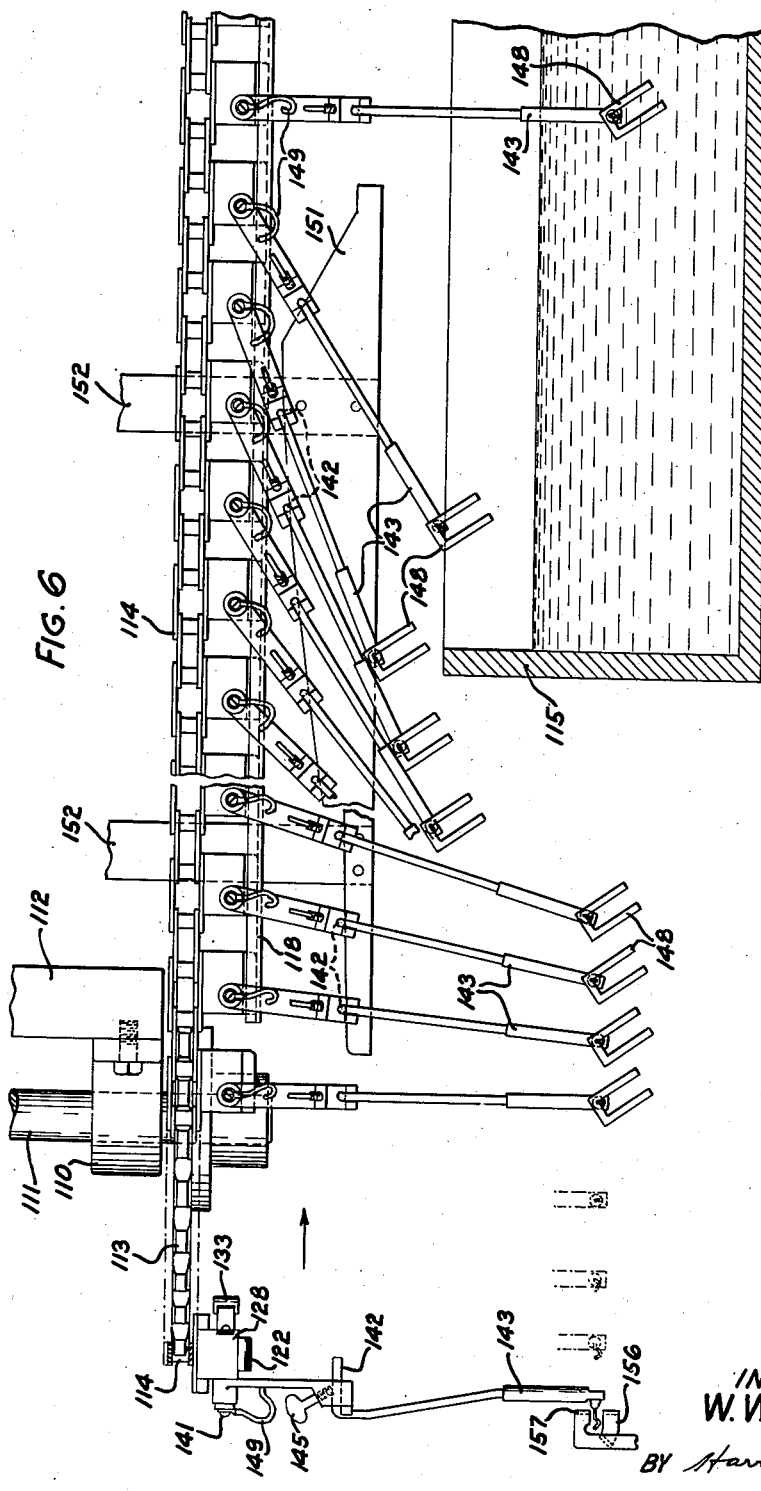

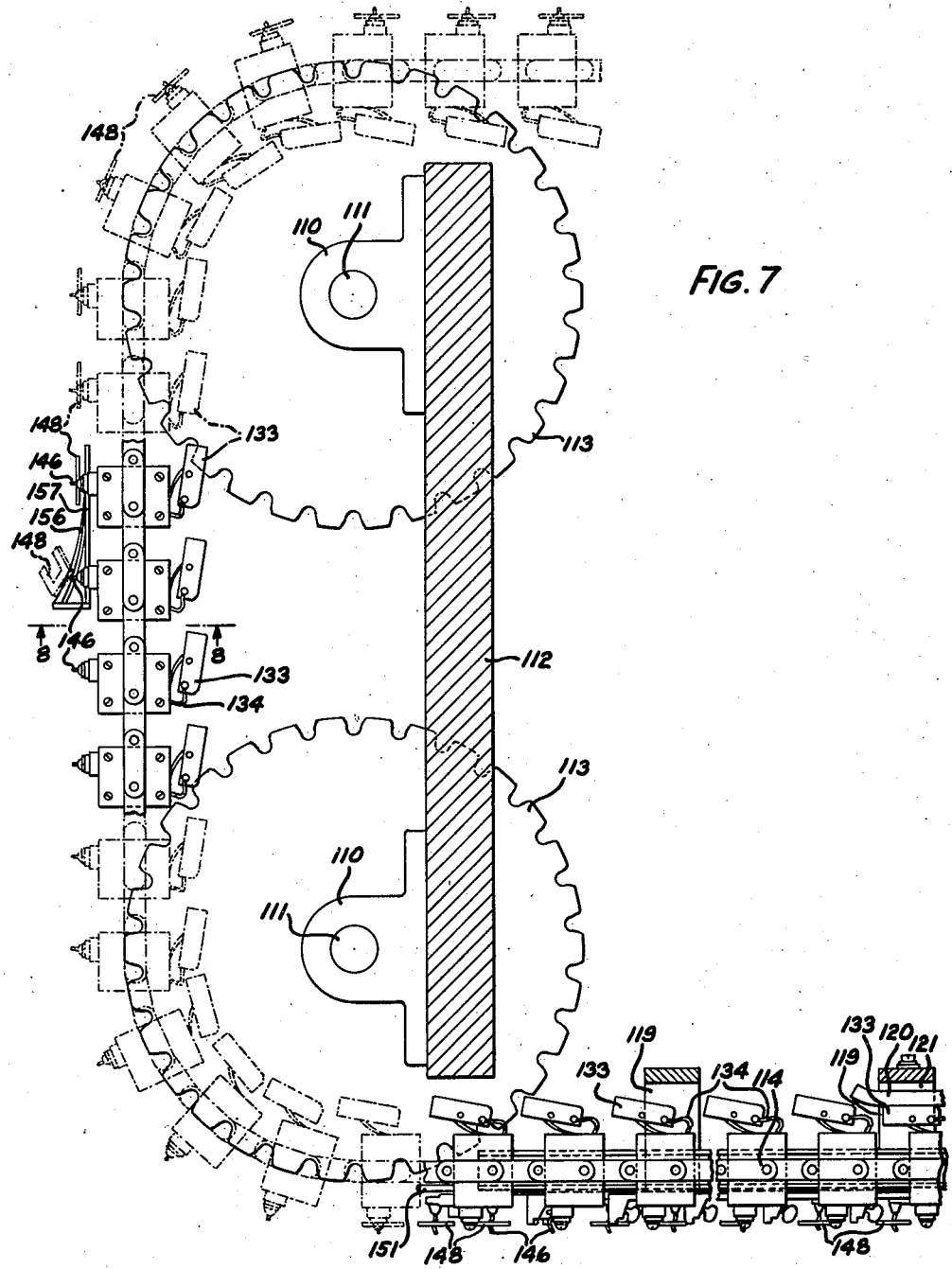

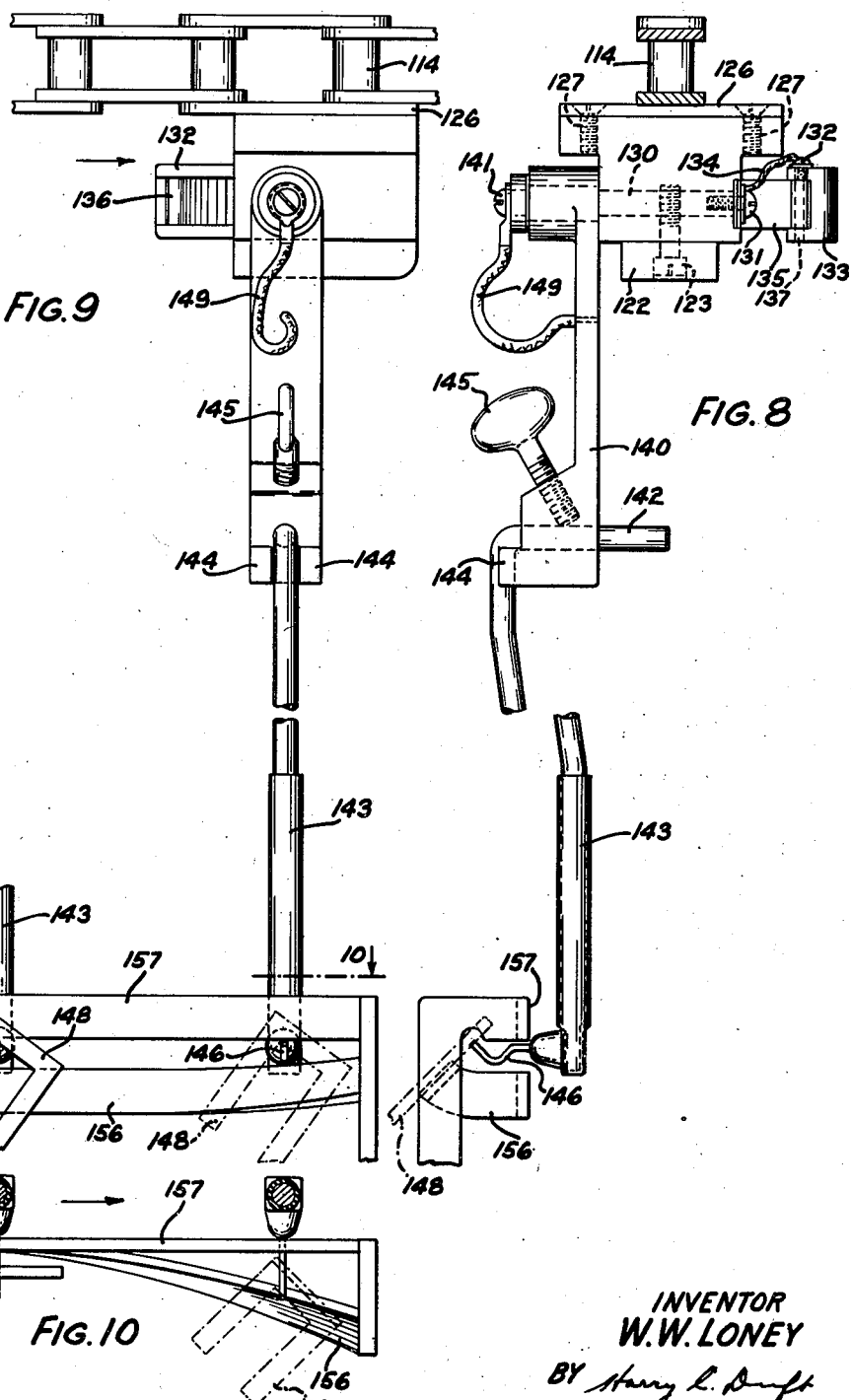

Patented Oct. 16, 1945

2,387,160

UNITED STATES PATENT OFFICE 2,387,160

ARTICLE HANDLING APPARATUS

William W. Loney, La Grange, Ill., assignor to Western Electric Company, Incorporated, New York, N. Y., a corporation of New York Application May 12, 1942, Serial No. 442,658

3 Claims. (Cl. 198—179)

This invention relates to article handling apparatus, and more particularly to apparatus for handling articles during electroplating.

An object of the present invention is to provide a conveying apparatus for efficiently handling articles in an electroplating apparatus.

In accordance with this and other objects, this invention may be embodied in an apparatus having a channel-shaped track in which article carriers are slidably mounted and attached to a conveyor chain which is in turn driven by a motor. A bus bar is mounted along the path of the carriers and connected to a current supply and a collecting shoe is associated with each carrier so as to contact the bus bar. Two types of carriers are provided; one for use with a chromium plating apparatus and the other for use with a nickel plating apparatus. In the chromium plating apparatus, a spring pressed clamp is mounted at the lower ends of a pair of arms which are pivotally attached to a carrier block. In the nickel plating apparatus, a simple hook is attached to the lower end of an arm, the upper end of which is pivotally mounted on the carrier block and electrically connected to the current-collecting shoe. Cams are provided for raising the articles as they approach a tank and to lower them as they leave a tank so as to pass over the edge of the tank. Cams are also provided for automatically unloading articles from the article carriers.

Other objects and advantages of this invention will be apparent from the following detailed description taken in connection with the following drawings, in which:

Fig. 1 is a side elevation showing a portion of a chromium plating apparatus;

Fig. 2 is a fragmentary plan view of the same;

Fig. 3 is an enlarged detail view taken along the line 3—3 of Fig. 1 showing an article carrier used with the chromium plating apparatus;

Fig. 4 is an enlarged detail view of the carrier shown in Fig. 3 rotated thru an angle of 90°;

Fig. 5 is a detail plan view of the article carrier showing the current-collecting shoe and bus bar;

Fig. 6 is a fragmentary side elevation of the apparatus used in a nickel plating process;

Fig. 7 is a fragmentary plan view of the same;

Fig. 8 is an enlarged detail view taken along the line 8—8 of Fig. 7 showing the article carrier and unloading means used with the nickel plating apparatus;

Fig. 9 is an enlarged detail view of the carrier shown in Fig. 8 rotated thru an angle of 90°; and Fig. 10 is a sectional plan view taken along the line 10—10 of Fig. 9 showing the article unloading means used with the nickel plating apparatus.

In some chromium plating processes, it is desirable that the article to be plated be not completely immersed in the plating solution but rather that a limited area only of the article be plated. Also in chromium plating it may be desirable that a positive electrical contact be made between the articles to be plated and the current supply. Thus, a clamp may be provided for holding and closely contacting an article to be chromium plated. Since the clamp rigidly engages the article, the exact area plated may be controlled by adjusting the depth to which the article is dipped in the electroplating bath and in this way, a considerable economy of plating material may be effected where it is unnecessary to plate an entire article.

Referring now to the drawings, Figs. 1 and 2 show a portion of an apparatus constructed in accordance with one embodiment of this invention for chromium plating a selected area of an article. A large supporting bracket 10 is provided which may be hung from an overhead frame (not shown). Two pairs of journal bearings 11 are mounted vertically on the bracket 10 and rotatably support a pair of shafts 12 to which are keyed and on which are supported a pair of sprocket wheels 13. It will be understood that a similar arrangement of sprocket wheels may be provided at the other end of the apparatus and that conventional driving means may be attached thereto. These sprocket wheels serve as a support for an endless conveyor chain 14 which passes around them and over the tanks with which this apparatus is intended to be used.

A second pair of sprocket wheels 15 are mounted below the sprocket wheels 13 and are also keyed to the shafts 12. A short chain 16 passes around this second pair of sprocket wheels and is used in the unloading operation as will be hereinafter explained.

As may be seen in Fig. 3, a channel-shaped track 20 is supported on the horizontal portion of a bracket 21 and serves as a support for article carriers. The article carriers comprise blocks 22 which may be slidably positioned on the track by a shoe 23 attached to the bottom of each block by a countersunk bolt 24. These blocks are formed of insulating material such as phenolized canvas. A number of brackets 21 may be used, spaced at intervals along the track, and are supported from an overhead frame (not shown). A bus bar 30 is supported on the vertical portion of the bracket 21 and insulated therefrom by an insulating strip 31. The bus bar may be connected to a current supply (not shown).

A lower plate 32 of a link of the chain 14 is attached to the top of each carrier block by a number of screws 33 which preferably have their heads flush with the plate. The chain serves both as a support for the carrier blocks when they are not supported by the track, and as a means for moving the carrier blocks. A current conductor 35, such as a copper rod, having terminal screws 36 and 37 at either end, is inserted through the carrier block and is connected to a terminal 38 on a current collecting shoe 39 by a flexible wire 40. A pair of flat springs 41 and 42 are attached to the carrier block by the screw 36. The spring 41 serves as a resilient support for the current collecting shoe which is pivotally attached thereto by a pivot 43, while the spring 42 serves to urge the rear of the shoe away from the carrier, causing the front of the shoe to move relatively away from the bus bar, the shoe pivoting on the pivot 43. Thus, when the shoe is not pressed against the bus bar, it assumes an angle thereto which avoids head-on contact with the end of the bus bar when the shoe is again carried thereto.

A pair of arms 48 are pivotally attached to the carrier block by a pivot 49 mounted on the outer side of the carrier block. A cam engaging block 50 is mounted between these arms and is used in elevating the arms where necessary to lift an article over the edge of a tank, and a second pair of arms 51 is attached to a pivot 52 mounted between and at the lower ends of the arms 48. A clamp 53 is pivotally attached to a raised portion 54 of each of these lower arms by a pivot 55 and is provided with a knife edge contact 56 inserted in the lower end of the clamp. The clamp is held normally closed by a coil spring 57 associated therewith and mounted on the pivot 54. Current is supplied to the clamp and to the articles to be plated by a flexible wire 58 connected by a terminal 59 to a cross piece 60 between the lower arms. The upper end of the terminal is attached to the conductor 35 by the terminal 37.

In the operation of the chromium plating apparatus, an article 61 to be plated is clamped to the carrier by an operator as the carrier leaves the article unloading station. The carrier is then moved along by the chain and as it approaches a tank 62 as shown in Fig. 1, the projecting block 50 mounted between the upper arms engages an elevating cam 65 positioned at the edge of the tank and extending a sufficient distance to either side to cause the upper arms to pivot outwards and lift the article over the edge of the tank and to lower the article into the tank, the lower arms being pivotally attached to the upper arms remain substantially vertical. Thus, a narrow tank may be used with consequent savings in space and material. The elevating cam is supported by a pair of brackets 66 which may in turn be supported by an overhead frame (not shown). Although only one such cam has been shown, it will be understood that two cams must be provided for each tank, one cam at the entrance side of the tank to elevate the articles as they reach the tank and to lower them into the tank, and the other cam at the exit side of the tank to elevate the articles as they reach the end of the tank. It will also be understood that any number of tanks may be used in this process without departing from the scope of the invention.

When the chromium plating process is completed, the article and carrier are returned to an unloading station by the conveyor chain. As may be seen in Figs. 1 and 2, the unloading station comprises a cam 70 mounted on a pair of brackets 71 which are in turn attached to the large bracket 10. As the carrier and article move into the unloading position, the upper portion of the clamp arm 53 engages the unloading cam. At the same time, the lower portion of the back of the lower arms 51 is engaged by a plate 72, one of which is attached to each link of the short chain 16 and prevents the article supporting arm from pivoting away from the unloading cam. Since the chain 16 is supported by the lower sprocket wheels which are keyed to the same shafts as the upper sprocket wheels, these plates move at the same speed as the article carriers. Thus, as each carrier is moved along by the conveyor chain, the clamp arm is held in engagement with the unloading cam, and as the carrier reaches the cam, the clamp is opened and the plated article drops into a suitable receptacle. The carrier is then ready to be reloaded.

Turning now to the nickel plating apparatus, in some nickel plating processes, it may be desirable that the article to be plated be entirely immersed in the plating bath so that the article will be completely plated. If the article is completely immersed in the bath, then it will be apparent that a portion of the article carrier must also be immersed and consequently plated. This plating of the carrier is often undesirable and the plating is usually removed, before reusing the carrier, by passing the plated portion of the carrier through a stripping bath. Since in nickel plating a sufficient electrical contact may be had through the contact afforded by the weight of the article on the support, a simple hook may be used instead of the clamp used in the above described chromium plating apparatus.

Figs. 6 through 10 show a nickel plating apparatus constructed in accordance with the present invention. As may be seen in Figs. 6 and 7, the general design of the apparatus is quite similar to that of the chromium plating apparatus. A pair of journal bearings 110 rotatably support a pair of vertical shafts 111 and are themselves mounted on a bracket 112 which may in turn be attached to an overhead frame (not shown). A pair of sprocket wheels 113 are keyed to and supported by the shafts 111 and serve as a support for an endless conveyor chain 114. A similar arrangement of sprocket wheels may be employed at the other end of the apparatus (not shown) and a conventional driving means may be attached thereto. The chain passes around all the sprocket wheels and various plating baths may be positioned beneath the chain, a single tank 115 only being shown.

A channel-shaped track 118, in all respects similar to the channel shaped track used with the chromium plating apparatus, is supported underneath the chain by a number of brackets 119 which also serve as a support for a bus bar 120 mounted parallel to the track and connected to a suitable current supply. A strip of insulating material 121 is provided to insulate the bus bar from the supporting brackets. A number of carrier blocks 128 of insulating material, such as phenolized canvas, are shown slidably positioned on the track by shoes 122, one of which are attached to the bottom of each block by a countersunk bolt 123.

A lower plate 126 of each link of the chain 114 is attached to the carrier block by a number of screws 127, the heads of which are flush with the plate. The track extends only between the sprocket wheels, and while a carrier is passing around a sprocket wheel it is supported by the chain alone. Thus, the chain serves both as a support for the carriers when they are not supported by the track, and as a means for moving them.

A current conductor 130, such as a copper rod, is inserted through the carrier block so as to conduct current through the block. A terminal 131 is provided at the inside end of the conductor and is connected to a terminal 132 on a current collecting shoe 133 by a flexible wire 134. A pair of flat springs 135 and 136 are also attached to the block by the terminal 131. Spring 135 serves as a resilient support for the current collecting shoe which is pivotally attached thereto by a pivot 137, while the spring 136 serves to urge the rear of the shoe away from the carrier, causing the front of the shoe to move relatively away from the bus bar, the shoe pivoting on the pivot 137. Thus, when the shoe is not pressed against the bus bar, it assumes an angle thereto which avoids head-on contact with the end of the bus bar when the shoe is again carried thereto.

As may be seen in Figs. 8 and 9, a carrier arm 140 is pivotally attached to the outer side of the carrier block by a bolt 141 which also contacts the current conductor 130, thus serving both as a support and a current terminal. The lower end of the arm is apertured to receive the upper end 142 of a lower arm 143. This upper end is bent at substantially right angles to the arm and thus serves as a means for attaching the lower arm to the upper, the lower end of the upper arm being provided with a pair of projections 144 which engage the lower arm to prevent the lower arm from pivoting independently of the upper arm. The bent portion of the lower arm extends through the aperture in the upper arm a sufficient distance to serve as a cam engaging member in raising the arms, as will be hereinafter explained. A thumbscrew 145 is threaded into the lower end of the upper arm so as to engage the bent portion of the lower arm to hold it in place and at the lower end of the lower arm is a hook 146 which serves as a support for an article 148 to be plated. A short flexible conductor 149 connects the upper arm to the conductor 130 through the terminal bolt 141.

The operation of this apparatus is broadly similar to the operation of the chromium plating apparatus. An article may be placed on the article carrying hook as the empty article carriers are moved from the unloading station by the continuously moving conveyor chain. As the article carriers approach an electroplating tank 115 as shown in Fig. 6, the bent and projecting portion 142 of the lower arm engages the upper surface of an elevating cam 151 mounted on brackets 152. This cam extends a short distance on both sides of the edge of the tank and causes the arms 140 and 143 to be pivoted rearwardly upwards a sufficient distance so that the supported article will pass over the edge of the tank. As the carriers move over the tank, the cam lowers the arms so as to position the article in the tank. As in the chromium plating apparatus, two elevating cams must be associated with each tank and any desired number of tanks may be used.

When the nickel plating is completed, the article carrier is returned to the unloading station which comprises a cam 156 which, as may be seen in Figs. 6 and 7 is positioned between the sprocket wheels at the left end of the apparatus. The ends of the cam are bent and extend to engage a suitable support (not shown). To facilitate unloading, an arm 157 is positioned above the unloading cam and has its ends suitably bent and extended to engage a support (not shown). As the lower part of the article engages the unloading cam and begins to pivot on the hook, the upper part will engage the arm 157 thus preventing further pivoting of the article. As the article is moved further along, the cam will remove the article completely from the hook.

In practice the nickel plating apparatus and the chromium plating apparatus may be used together. A coating of nickel may first be applied to the article and then a coating of chromium applied to selected areas such as areas of the articles which are most subject to wear.

While but two embodiments of this invention have been shown and described, it will be understood that many changes and alterations may be made therein without departing from the scope and spirit of the present invention, and it will be understood that while the apparatus described has been described as used either in chromium plating or nickel plating processes or both, the apparatus may be adaptable to many other processes.

What is claimed is:

1. In an electroplating apparatus, a sprocket wheel, a chain associated with said sprocket wheel, a second sprocket wheel mounted below said sprocket wheel and in axial alignment therewith, a chain associated with said second sprocket wheel, a carrier attached to the upper chain, an article supporting arm pivotally mounted on said carrier, a clamp on said arm for engaging an article, a cam positioned along the path of said carrier and engageable by said clamp to open said clamp, means for moving said clamp with respect to said cam, and means on the lower chain for holding the clamp in engagement with said cam.

2. In an electroplating apparatus, a rotary supporting and driving member, an endless conveyor member associated with said rotary member, a second rotary member below and in axial alignment with said first rotary member, a second endless conveyor member associated with the second rotary member, a carrier attached to the upper conveyor member, an article supporting arm pivotally mounted on said carrier, a clamp on the arm for engaging an article, and a cam positioned along the path of the carrier and engageable by the clamp to open the clamp when the clamp is moved with respect to the cam, said lower conveyor member holding the clamp in engagement with said cam.

3. In an electroplating apparatus, a rotary supporting and driving member, an endless conveyor member supported and driven by said rotary member, a second rotary member in axial alignment with said first rotary member, means carried by said second rotary member in alignment with the endless conveyor member, a carrier attached to the conveyor member, an article supporting arm pivotally mounted on said carrier, a clamp on the arm for engaging an article, and a cam positioned along the path of the carrier and engageable by the clamp to open the clamp, said conveyor member moving the clamp with respect to the cam, said means carried by the second rotary member holding the clamp in engagement with said cam.

WILLIAM W. LONEY.